United States Patent
Yamamoto et al.

(10) Patent No.: US 7,651,422 B2
(45) Date of Patent: Jan. 26, 2010

(54) SHIFT CONTROL SYSTEM IN BELT-TYPE CONTINUOUSLY VARIABLE TRANSMISSION

(75) Inventors: Masahiro Yamamoto, Fuji (JP); Midori Yamaguchi, Fuji (JP); Shigeki Shimanaka, Fuji (JP); Hiroyasu Tanaka, Fuji (JP); Hironobu Waki, Fuji (JP)

(73) Assignee: Jatco Ltd (JP)

( * ) Notice: Subject to any disclaimer, the term of this patent is extended or adjusted under 35 U.S.C. 154(b) by 1257 days.

(21) Appl. No.: 10/788,720

(22) Filed: Feb. 27, 2004

(65) Prior Publication Data

US 2004/0171445 A1   Sep. 2, 2004

(30) Foreign Application Priority Data

Feb. 27, 2003   (JP)   ............................ 2003-050805

(51) Int. Cl.
*F16H 61/00*   (2006.01)
(52) U.S. Cl. ........................................................ 474/28
(58) Field of Classification Search ...................... 474/8, 474/11, 18, 28, 38
See application file for complete search history.

(56) References Cited

U.S. PATENT DOCUMENTS

| | | | | | |
|---|---|---|---|---|---|
| 4,557,706 | A | * | 12/1985 | Tanaka et al. | 474/28 |
| 4,589,071 | A | * | 5/1986 | Yamamuro et al. | 701/55 |
| 4,782,934 | A | * | 11/1988 | Takano et al. | 477/39 |
| 5,218,540 | A | * | 6/1993 | Ishikawa et al. | 701/60 |
| 6,494,808 | B2 | * | 12/2002 | Lee | 477/94 |
| 7,104,907 | B2 | * | 9/2006 | Jozaki et al. | 474/28 |
| 7,112,154 | B2 | * | 9/2006 | Wakahara et al. | 474/28 |

FOREIGN PATENT DOCUMENTS

JP   09-203459 A   5/1997

* cited by examiner

*Primary Examiner*—Vicky A Johnson
(74) *Attorney, Agent, or Firm*—Rossi, Kimms & McDowell LLP

(57) ABSTRACT

When a speed of a vehicle is less than 8 km/h, an upshift determination condition is established, an idle switch signal is turned off, and a downshift is detected, an operating speed of the step motor is limited. Thereby, since the operating speed of the step motor is limited even when the vehicle is rapidly decelerated and re-accelerated before a pulley ratio is returned to a lowest value Lo, a shift speed of the downshift performed in the re-acceleration is lowered, and no slippage occurs in a V-belt between pulleys.

6 Claims, 4 Drawing Sheets

SHIFT CONTROL SYSTEM IN BELT-TYPE CONTINUOUSLY VARIABLE TRANSMISSION

BACKGROUND OF THE INVENTION

1. Field of the Invention

The present invention relates to a shift control system in a belt-type continuously variable transmission.

2. Description of the Prior Art

Conventionally, as a continuously variable transmission for a vehicle, there is, for example, a belt-type continuously variable transmission with a V-belt. Generally, in the continuously variable transmission, a hydraulic pressure (hereinafter referred to as a primary pulley pressure) which is obtained by regulating a line pressure as an original pressure with a shift control valve is supplied to a cylinder chamber of a primary pulley, and a gear ratio of the vehicle such as an automobile is continuously controlled by increasing and reducing the primary pulley pressure with the shift control valve to change a groove width of the primary pulley and changing a radius ratio between the primary pulley and a secondary pulley. This shift control valve is connected to the vicinity of a middle of a shift link constituting a mechanical feedback mechanism, and a movable flange of the primary pulley and a step motor that is a shift actuator are respectively connected to both ends of the shift link.

When the vehicle in which such a continuously variable transmission is mounted is stopped after it is rapidly decelerated, the vehicle may be stopped before a pulley ratio is returned to a lowest value Lo (low speed side). If the radius ratio between the primary pulley and the secondary pulley is rapidly changed when the pulley is rotated at a low speed, slippage may occur in the V-belt because of the construction of the continuously variable transmission. Therefore, in case the vehicle is restarted after it is stopped from the rapid deceleration as described above, and difference between a target gear ratio (lowest value Lo) at the time of start of the vehicle and an actual gear ratio is large, shift speed is lowered for prevention of slippage of the V-belt. An example of this continuously variable transmission is disclosed in Japanese Patent laid-open patent publication No. 9-203459.

In this conventional continuously variable transmission, in case re-acceleration is performed without stopping the vehicle after the rapid deceleration to the low speed, the vehicle is brought into acceleration before the pulley ratio is returned to the lowest value Lo (low speed side), and a target gear ratio lowest value Lo is commanded to the pulley so that a quick acceleration can be realized. Thus, a problem is involved in that slippage occurs in the V-belt since the actual gear ratio that is not returned to the lowest value Lo at the time of rapid deceleration is forced to the lowest value Lo that is the target gear ratio.

SUMMARY OF THE INVENTION

The present invention has been made in view of the aforementioned problem, and its object is to provide a shift control system in a belt-type continuously variable transmission in which no slippage of a V-belt occurs even when re-acceleration is performed after a vehicle is rapidly decelerated to a low speed.

Therefore, the present invention provides a shift control apparatus for use with a V-belt type continuously variable transmission for a vehicle in which a V-belt is wound between a primary pulley of an input side connected to an engine and a secondary pulley of an output side, a primary pulley pressure acting on the primary pulley and a secondary pulley pressure acting on the secondary pulley are generated respectively by using a line pressure as an original pressure, and a shift actuator is operated to an operating position corresponding to a target gear ratio, whereby a differential pressure is generated between the primary pulley pressure and the secondary pulley pressure to change widths of V-shaped grooves of the primary pulley and the secondary pulley so that an actual gear ratio that is obtained from speed ratio of the primary pulley and the secondary pulley becomes equal to the target gear ratio, comprising: shift control means for controlling the shift actuator; speed detecting means for detecting a speed of the vehicle; downshift detecting means for detecting a downshift of the belt-type continuously variable transmission, and idle state detecting means for detecting an idle state of the engine, wherein when a speed detected by the speed detecting means is less than a first predetermined speed, the downshift detecting means detects the downshift, and the idle state detecting means does not detect the idle state of the engine, the shift control means limits an operating speed of the shift actuator.

According to the present invention, when the speed of the vehicle is less than a predetermined speed, a downshift is detected by the downshift detecting means, and an idle state of the engine is not detected by the idle state detecting means, the operating speed of the shift actuator is limited. Thereby, even when the vehicle is rapidly decelerated and re-accelerated before the pulley ratio is returned to the lowest value Lo, the operating speed of the shift actuator is limited by the shift control means, whereby shift speed of downshift that is performed at the time of re-acceleration is lowered, and no slippage occurs in the V-belt between the pulleys.

The above and further objects and features of the invention will be more fully apparent from the following description when the same is considered with reference to the accompanying drawings.

DETAILED DESCRIPTION OF THE PREFERRED EMBODIMENT

A preferred embodiment of the present invention will be described hereinbelow.

Figure 1:
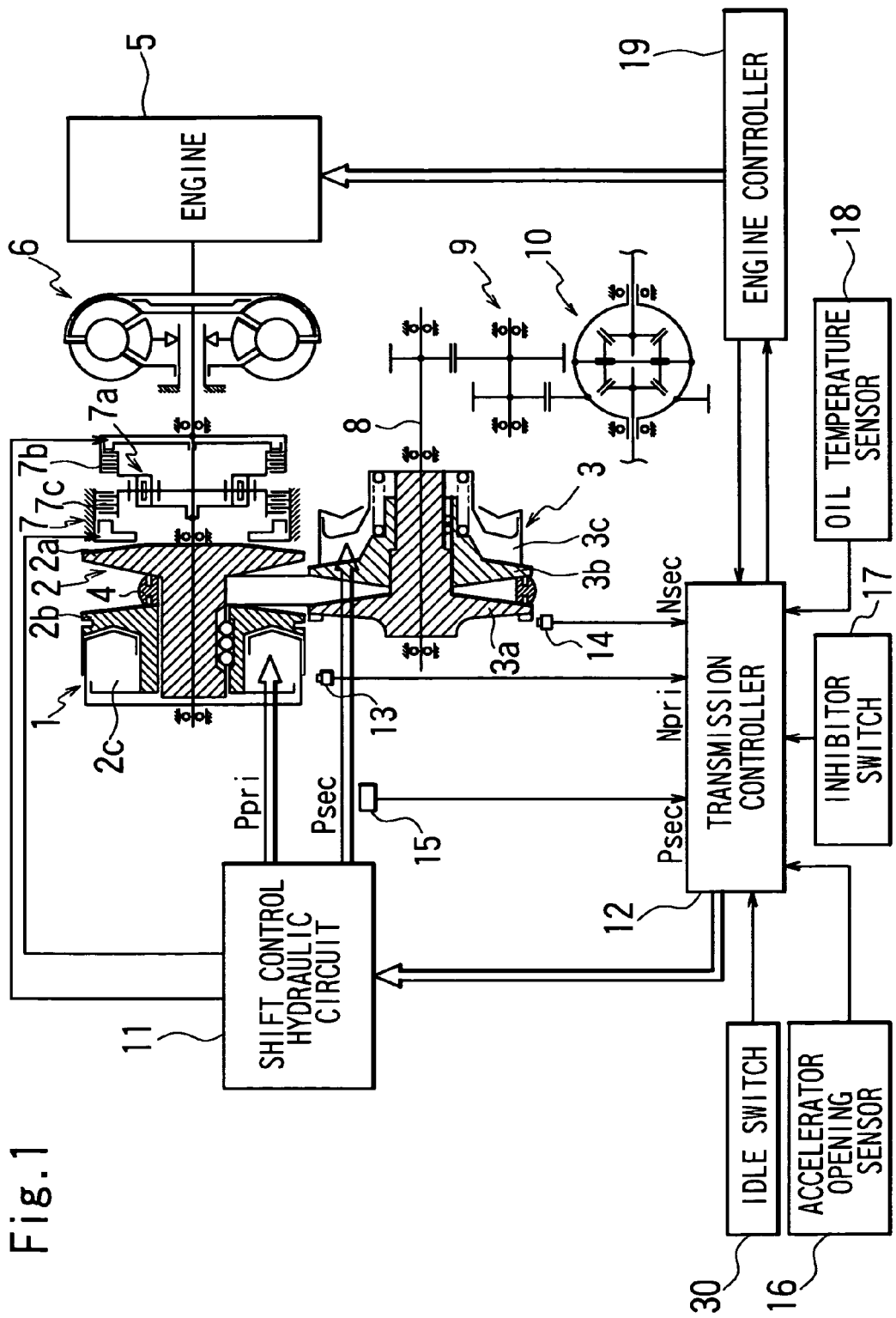
FIG. 1 is a diagram showing an embodiment according to the present invention.

FIG. 1 shows a schematic construction of a V-belt type continuously variable transmission.

A primary pulley 2 and a secondary pulley 3 are arranged so that their V-shaped grooves are aligned, and a V-belt 4 is wound around the V-shaped grooves of the pulleys 2, 3. An engine 5 that is a driving source is arranged coaxially with the primary pulley 2, and a torque converter 6 having a lockup mechanism and a forward/reverse switching mechanism 7 are sequentially provided between the engine 5 and the primary pulley 2. The torque converter 6, the forward/reverse switching mechanism 7, the primary pulley 2, the secondary pulley 3 and the V-belt 4 constitutes a V-belt type continuously variable transmission 1.

The forward/reverse switching mechanism 7 is comprised mainly of a double pinion planetary gear set 7a and includes a sun gear connected through the torque converter 6 to the engine 5 and a carrier connected to the primary pulley 2. The forward/reverse switching mechanism 7 has a forward clutch 7b directly connecting the sun gear and the carrier of the double-pinion planetary gear set 7a and a backward brake 7c fixing a ring gear and transmits input rotation, which is transmitted through the torque converter 6 from the engine 5, to the primary pulley 2 when the forward clutch 7b is engaged. Further, when the backward brake 7c is engaged, the forward/reverse switching mechanism 7 reverses and reduces an input rotation transmitted through the torque converter 6 from the engine 5 and transmits this input rotation to the primary pulley 2.

Rotation of the primary pulley 2 is transmitted through the V-belt 4 to the secondary pulley 3, and then rotation of the secondary pulley 3 is transmitted through an output shaft 8, a gear set 9 and a differential gear 10 to not-shown wheels. In order to make it possible to change a rotation transmission ratio (gear ratio) between the primary pulley 2 and the secondary pulley 3 during the above-mentioned power transmission, one of flanges defining the V-shaped grooves of the primary pulley 2 and the secondary pulley 3 is used as fixed flanges 2a, 3a, and other flanges 2b, 3b are used as movable flanges capable of being displaced in the axial direction.

These movable flanges 2b, 3b are biased to the fixed flanges 2a, 3a by supplying a primary pulley pressure Ppri and a secondary pulley pressure Psec, which are obtained by using after-mentioned line pressure as an original pressure, to a primary pulley chamber 2c and a secondary pulley chamber 3c, whereby the V-belt 4 is frictionally engaged both between the fixed flange 2a and the movable flange 2b and between the fixed flange 3a and the movable flange 3b to enable the above-mentioned power transmission between the primary pulley 2 and the secondary pulley 3.

This embodiment especially aims to miniaturize the V-belt type continuously variable transmission by equalizing a pressure receiving area of the primary pulley chamber and that of the secondary pulley chamber and by preventing one of the pulleys 2, 3 from having a large diameter.

In a gear shift (speed change), differential pressure between the primary pulley pressure Ppri and the secondary pulley pressure Psec which are generated according to a target gear ratio changes width of V-shaped grooves of the pulleys 2, 3, and a winding radius of the V-belt 4 with respect to these pulleys 2, 3 is continuously changed, whereby the target gear ratio can be realized.

Outputs of the primary pulley pressure Ppri and the secondary pulley pressure Psec are controlled by a shift control hydraulic circuit 11, together with outputs of engagement hydraulic pressures of the forward clutch 7b to be engaged at the time of selecting a forward running range and the backward brake 7c to be engaged at the time of selecting a backward running range. This shift control hydraulic circuit 11 performs this control in response to a signal from a transmission controller 12.

Therefore, the transmission controller 12 receives a signal from a primary pulley rotation sensor 13 for detecting a primary pulley revolution Npri, a signal from a secondary pulley rotation sensor 14 for detecting a secondary pulley revolution Nsec, a signal from a secondary pulley pressure sensor 15 for detecting the secondary pulley pressure Psec, a signal from an accelerator opening sensor 16 for detecting an accelerator depression amount APO, a selection range signal from an inhibitor switch 17, a signal from an oil temperature sensor 18 for detecting a sift operation oil temperature TMP, a signal (engine speed or fuel injection time) concerning a transmission input torque from an engine controller 19 for controlling the engine 5 and a signal from an idle switch 30 for detecting whether the engine 5 is in an idle state.

Figure 2:
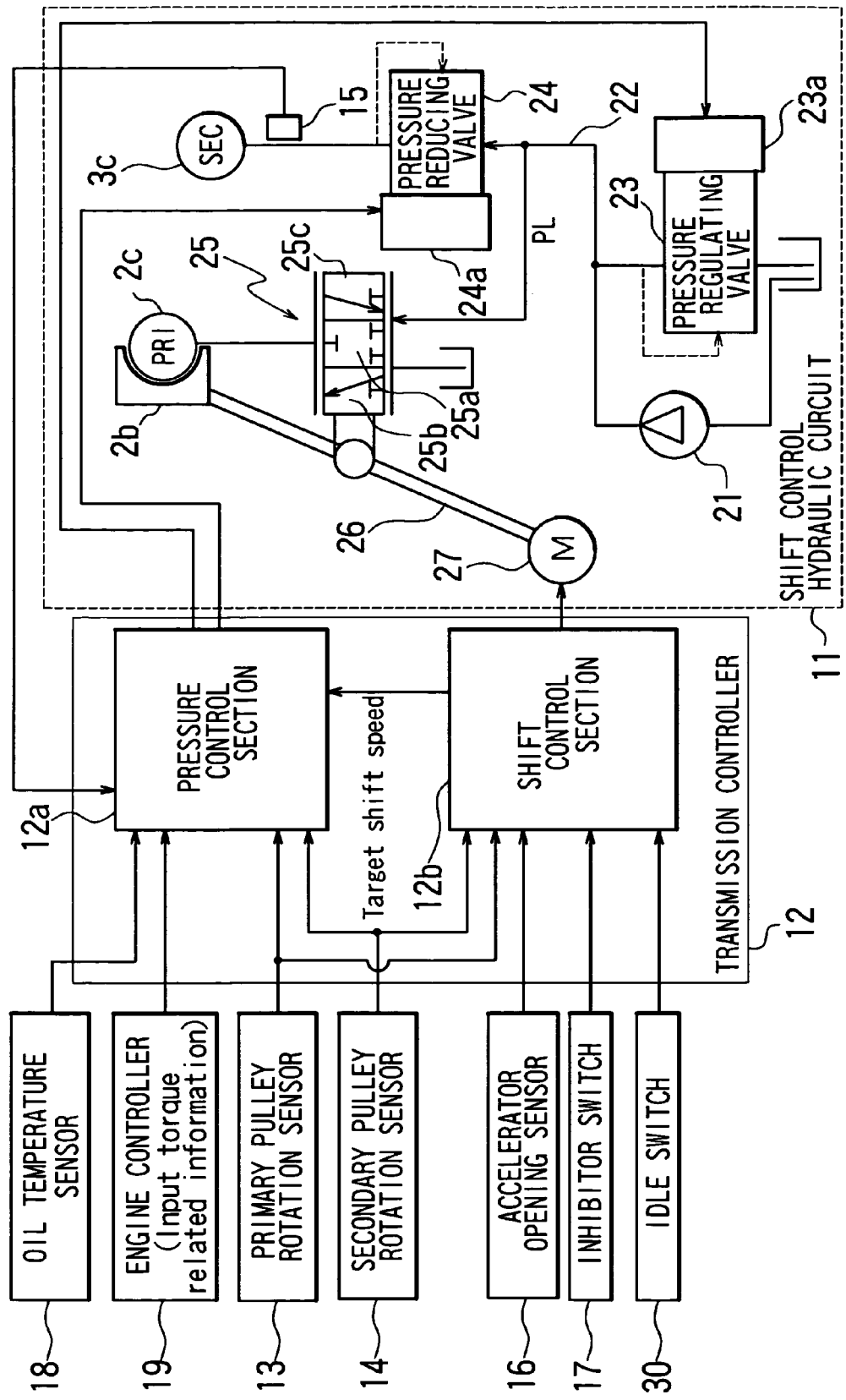
FIG. 2 is a diagram showing a detail of a shift control system for a V-belt type continuously variable transmission.

Next, controls performed in the shift control hydraulic circuit 11 and the transmission controller 12 will be explained with reference to FIG. 2.

The shift control hydraulic circuit 11 is provided with an oil pump 21 driven by the engine, employs working fluid supplied from the oil pump 21 to an oil passage 22 as medium and regulates the working fluid to a predetermined line pressure PL with a pressure regulator valve (P.Reg valve) 23. The line pressure PL of the oil passage 22 is regulated by a pressure reducing valve 24 and supplied to the secondary pulley chamber (SEC) 3c as the secondary pulley pressure Psec on the one hand and is regulated by a shift control valve 25 and supplied to the primary pulley chamber (PRI) 2c as the primary pulley pressure Ppri on the other hand. The pressure regulator valve 23 controls the line pressure PL with a drive duty applied to a solenoid 23a, and the pressure reducing valve 24 controls the secondary pulley pressure Psec with a drive duty applied to a solenoid 24a.

The shift control valve 25 has a neutral position 25a, a pressure increasing position 25b and a pressure reducing position 25c and is connected to the middle of a shift link 26 to change these valve positions. A step motor (M) 27 as a shift actuator is connected to one end of the shift link 26, the other end of which is connected to the movable flange 2b of the primary pulley. The step motor 27 is driven to an operating position advancing from a reference position by the number of step corresponding to a target gear ratio, and this driving of the step motor 27 causes the shift link 26 to displace with a portion connected to the movable flange 2b as a supporting point, thereby changing the shift control valve 25 from the neutral position 25a to the pressure increasing position 25b or the pressure reducing position 25c.

As a result, when the target gear ratio is set at a high speed range side (upshift side), the line pressure PL is brought into communication with a primary pulley pressure Ppri side, and when the target gear ratio is set at a low speed range side (downshift side), on the other hand, the primary pulley pressure Ppri is brought into communication with a drain side. Thereby, the primary pulley pressure Ppri is increased by using the line pressure PL as an original pressure or reduced by the drain to change differential pressure between the primary pulley pressure Ppri and the secondary pulley pressure Psec, so that an upshift to a Hi-side gear ratio or a downshift to a Lo-side gear ratio is established and a shift operation toward the target gear ratio is performed.

Progress of the aforementioned gear shift is fed back to the shift link 26 through the movable flange 2b of the primary pulley, and the shift link 26 is displaced with the portion connecting with the step motor as a support in a direction where the shift control valve 25 is returned from the pressure increasing position 25b or the pressure reducing position 25c to the neutral position 25a. Thereby, when the target gear ratio is achieved, the shift control valve 25 is returned to the neutral position 25a, and the target gear ratio can be held. When the pulley is placed at the lowest position Lo, capacity of transmission torque of the V-belt 4 can be retained since a not-shown mechanical stopper gives reaction force to the pulley regardless of presence or absence of the primary pulley pressure Ppri.

The transmission controller 12 determines a solenoid drive duty of the pressure regulator valve 23, a solenoid drive duty of the pressure reducing valve 24 and a shift command to the step motor 27, while controlling supply of engagement hydraulic pressure to the forward clutch 7b and the backward brake 7c. This transmission controller 12 is constituted by a pressure control section 12a and a shift control section 12b as shown in FIG. 2.

The pressure control section 12a reads information related to an input torque from the engine controller 19, rotation signals from the primary pulley rotation sensor 13 and the secondary pulley rotation sensor 14, an oil temperature signal from the oil temperature sensor 18 and a target shift speed calculated by the shift control section 12b to determine a solenoid drive duty of the pressure regulator valve 23 and a solenoid drive duty of the pressure reducing valve 24.

The shift control section 12b determines a running state of the vehicle on the basis of a range signal from the inhibitor switch 17. Next, the shift control section 12b determines a target input speed on the basis of a predetermined shift map by using a vehicle speed that can be determined from the secondary pulley revolution Nsec and an accelerator pedal depression amount APO, and determines a target gear ratio according to driving states (the vehicle speed and accelerator pedal depression amount APO) by dividing the target input speed by the secondary pulley revolution Nsec.

Moreover, the shift control section 12b calculates an actual gear ratio (achieved gear ratio) by dividing the primary pulley revolution Npri by the secondary pulley revolution Nsec and determines a shift speed for gradually bringing the actual gear ratio close to the target gear ratio at a target shift speed while carrying out disturbance compensation according to a difference between the actual gear ratio and the target gear ratio.

When an actual gear ratio is gradually brought close to the target gear ratio, the target gear ratio can be achieved by setting an intermediate target gear ratio between the actual gear ratio and the target gear ratio and gradually bringing the intermediate target gear ratio close to the target gear ratio while gradually bringing the actual gear ratio close to the intermediate target gear ratio.

In this case, the target gear ratio can be achieved with the aforementioned shift operation by determining an operating speed of the step motor 27 for realizing the shift speed thus determined and commanding this operating speed to the step motor 27.

Further, the shift control section 12b receives a signal from an idle switch 30.

An operating speed limit control of the step motor in re-acceleration performed after the rapid deceleration of the vehicle to the low speed will be described with reference to FIG. 3 and FIG. 4.

Figure 3:
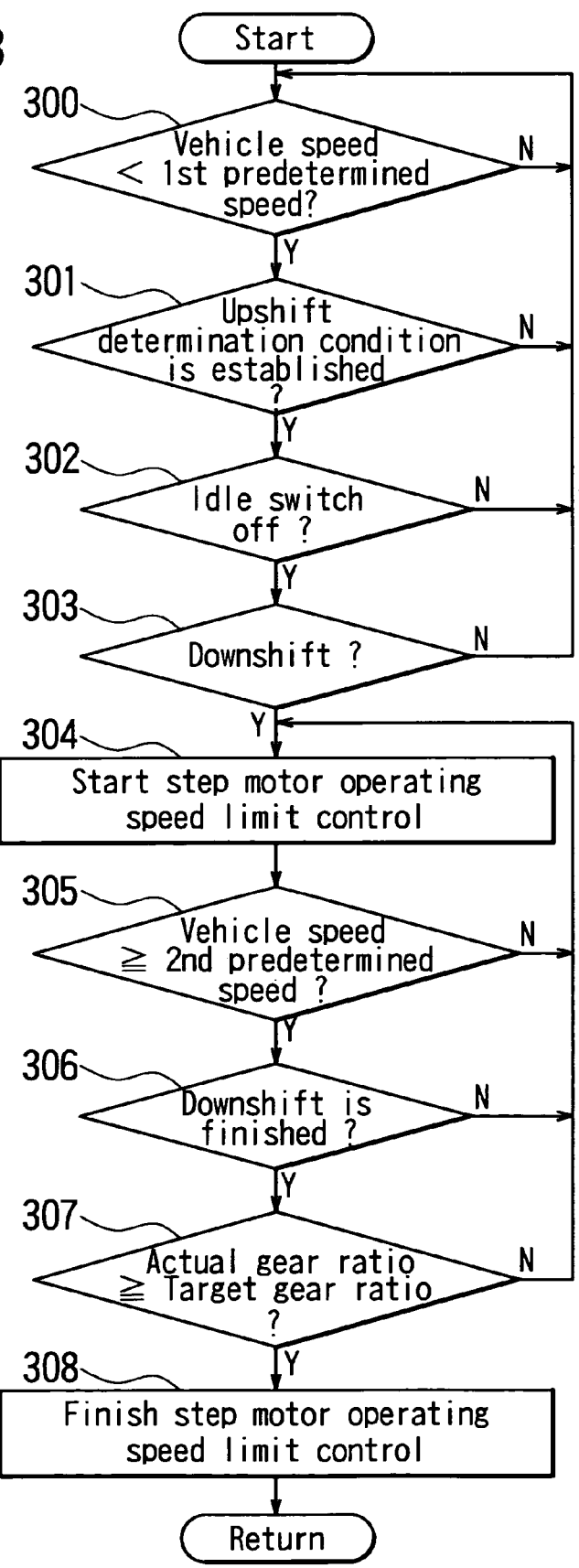
FIG. 3 is a chart showing a flow of an operating speed limit control performed by a shift control section.
Figure 4:
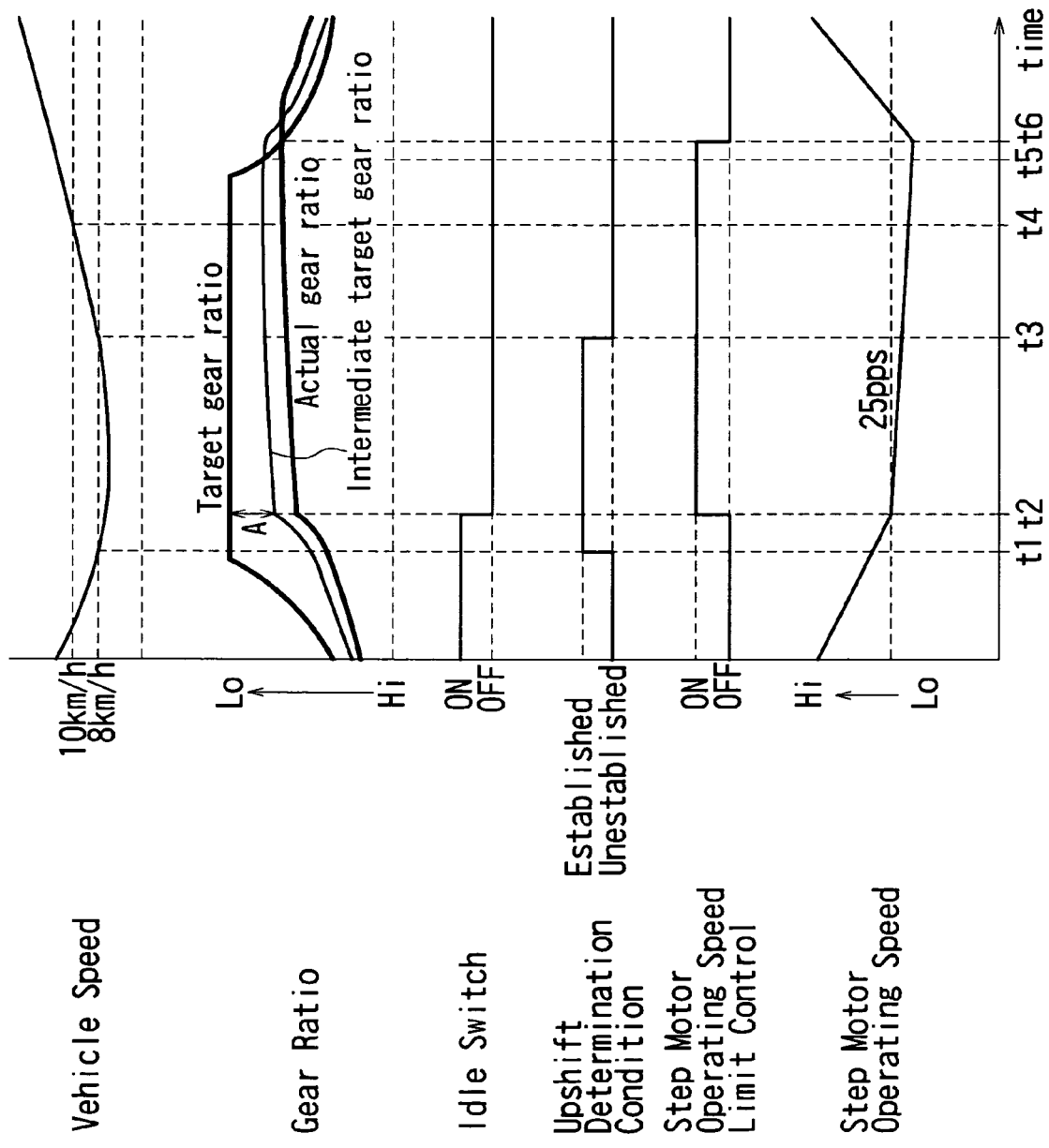
FIG. 4 is a diagram showing an operation of each section of the belt-type continuously variable transmission.

FIG. 3 shows a flow of the operating speed limit control of the step motor 27 performed by the shift control section 12b, and FIG. 4 is a time chart showing a flow of operation of each section.

When the vehicle starts to rapidly decelerate, the shift control section 12b determines whether the vehicle speed is less than a first predetermined speed (the first predetermined speed is set to 8 km/h in this embodiment) in a step 300 of FIG. 3.

At a time t1 when the vehicle speed is less than 8 km/h as shown in FIG. 4, a determination condition of the step 300 is established, and the routine proceeds to a step 301. In the step 301, it is determined whether an upshift determination condition is established. This determination is made to determine whether the vehicle speed is less than an upshift determination vehicle speed. In this embodiment, the upshift determination vehicle speed is set to be equal to the aforementioned first predetermined speed, and the upshift determination condition is set to be established at the time t1.

When the upshift determination condition is established, the shift control of the V-belt type continuously variable transmission 1 for acceleration (upshift) is performed on the assumption that the vehicle speed is a low speed and then the vehicle is accelerated. During shift control at the time of the establishment of the upshift determination condition, the shift control section 12b controls the step motor 27 so that the actual gear ratio is gradually brought close to the target gear ratio.

When the upshift determination condition is established, it is determined whether a signal from the idle switch 30 is an off signal in a step 302. When the signal from the idle switch 30 is turned off at a time t2 and the determination condition of the step 302 is established, it is determined whether the V-belt type continuously variable transmission 1 is being shifted down in a step 303. In this case, when the intermediate target gear ratio is shifted toward the target gear ratio and the intermediate target gear ratio and target gear ratio are greatly different from a predetermined value A, it is determined that the V-belt type continuously variable transmission 1 is being shifted down.

When it is determined that the V-belt continuously variable transmission 1 is being shifted down at the time t2, and the conditions of these steps 300 to 303 are all established, in a step 304 the shift control section 12b starts a step motor operating speed limit control for limiting the operating speed of the step motor 27. In this step motor operating speed limit control, a command pulse interval that is given to the step motor 27 is set to be equal to or less than 25 pps (pulse/sec).

After that, the vehicle starts to accelerate gradually, and when the vehicle speed exceeds 8 km/h at a time t3, the upshift determination condition becomes unestablished.

In a step 305, it is determined whether the vehicle speed is equal to or more than a second predetermined speed (the second predetermined speed is set to 10 km/h). When the vehicle speed is equal to or more than the second predetermined speed at a time t4, by using the intermediate target gear ratio and the target gear ratio, it is determined in a step 306 whether downshift is finished. This determination of the finish of the downshift is made in case the intermediate target gear ratio is at the Lo side relative to the target gear ratio. When it is determined that the downshift is finished at a time t5, it is determined whether the actual gear ratio becomes equal to or more than the target gear ratio (actual gear ratio is at the Lo side) and therefore upshift is started in a step 307.

When the actual gear ratio is closer to the Lo side than the target gear ratio at a time t6, the routine proceeds to a step 308. When these conditions of the aforementioned steps 305 to 307 are all established, the operating speed limit control of the step motor is finished in a step 308, and the step motor 27 is controlled at the operating speed at the time of the normal state.

During a period from the time t2 when the conditions of the steps 300 to 303 of FIG. 3 are all established to the time t6 when the conditions of the steps 305 to 307 are all established, the shift control section 12b limits the operating speed of the step motor 27. Thereby, shift speed of the V-belt type continuously variable transmission 1 is lowered during the period from the time t2 to the time t6.

In this embodiment, the step motor 27 constitutes the shift actuator according to the present invention. The secondary pulley rotation sensor 14 constitutes a speed detecting means, and the step 303 constitutes a downshift detecting means according to the present invention. The idle switch 30 constitutes an idling state detecting means according to the present invention, and the step 307 constitutes a gear ratio comparing means according to the present invention. The shift control section 12*b* constitutes a shift control means according to the present invention.

This embodiment is thus constructed, and when the vehicle speed is less than the first predetermined speed, the upshift determination condition is established, the idle switch signal is off, and the downshift is detected, the shift control section 12*b* limits the operating speed of the step motor 27. Thereby, since the operating speed of the step motor 27 is limited by the shift control section 12*b* even when the vehicle is rapidly decelerated and re-accelerated before the pulley ratio returns to the lowest value Lo, the shift speed of the downshift performed at the time of re-acceleration is lowered, and no slippage occurs in the V-belt 4 between the pulleys.

Even if the downshift is performed at the time of re-acceleration in case the difference between the intermediate target gear ratio and the target gear ratio is small, change-amount of the gear ratio is small, and no slippage of the V-belt 4 occurs. Therefore, in case the intermediate target gear ratio and the target gear ratio are greatly different from the predetermined value A, it is determined that the V-belt type continuously variable transmission 1 is shifted down, whereby the operating speed limitation of the step motor 27 is not performed when the difference between the intermediate target gear ratio and the target gear ratio is small, where no slippage occurs in the V-belt 4.

When the vehicle speed is less than the upshift determination vehicle speed, and the upshift determination condition is established, the shift control section 12*b* controls the step motor 27 so that the actual gear ratio is gradually brought close to the target gear ratio. Moreover, the shift control section 12*b* performs the step motor operating speed limit control even during the control of the step motor 27 that is performed in this upshift determination. If the upshift determination condition becomes unestablished, the shift control section 12*b* finishes the control of the stepmotor 27 to gradually bring the actual gear ratio close to the target gear ratio but continues the step motor operating speed limit control.

Thereby, since the step motor operating speed limit control is continued even when the upshift determination condition becomes unestablished, and the control of the step motor 27 performed at the time of upshift determination is changed to a normal mode, the operating speed of the step motor 27 is not rapidly changed, and the slippage of the V-belt 4 caused by the rapid change of the operating speed of the step motor 27 can be prevented.

When the vehicle speed becomes equal to or more than the second predetermined speed, downshift is finished, and the actual gear ratio is closer to the Lo side relative to the target gear ratio, the step motor operation limit control is finished. Since no slippage occurs in the V-belt 4 in case the aforementioned condition is established, the step motor operation limit control does not need to be performed, and the operation limit control can be properly finished.

The entire contents of Japanese Patent Application No. 2003-50805(filed Feb. 27, 2003) are incorporated herein by reference.

Although the invention has been described above by reference to certain embodiments of the invention, the invention is not limited to the embodiments described above. Modifications and variations of the embodiment described above will occur to those skilled in the art, in light of the above teachings. The scope of the invention is defined with reference to the following claims.

What is claimed is:

1. A shift control system for a V-belt type continuously variable transmission of a vehicle in which a V-belt is wound between a primary pulley of an input side connected to an engine and a secondary pulley of an output side, a primary pulley pressure acting on the primary pulley and a secondary pulley pressure acting on the secondary pulley are generated respectively with a line pressure as an original pressure, and a shift actuator operable to an operating position corresponding to a target gear ratio, wherein a differential pressure is generated between the primary pulley pressure and the secondary pulley pressure to change widths of V-shaped grooves of the primary pulley and the secondary pulley so that an actual gear ratio that is obtained from speed ratio of the primary pulley and the secondary pulley becomes equal to the target gear ratio, the shift control system comprising:

a transmission controller configured to control the shift actuator and configured to detect a downshift of the continuously variable transmission;

a speed detecting device configured to detect a speed of the vehicle; and an idle state detecting device configured to detect an idle state of the engine, wherein the transmission controller is configured to limit an operating speed of the shift actuator to prevent slippage of the V-belt when:

the speed detected by the speed detecting device is less than a first predetermined speed, the transmission controller detects the downshift, and the idle state detecting device does not detect the idle state of the engine.

2. The shift control system according to claim 1, wherein the transmission controller is configured to:

set an intermediate target gear ratio between the actual target gear ratio and the target gear ratio, the intermediate target gear ratio being gradually brought close to the target gear ratio, control the shift actuator so that the actual gear ratio reaches the intermediate target gear ratio, and detect the downshift when a difference is more than a predetermined value between the intermediate target gear ratio and the actual gear ratio.

3. The shift control system according to claim 1 or 2, wherein the transmission controller is configured to lower an operating speed of the shift actuator when a speed detected by the speed detecting device is less than an upshift determination vehicle speed.

4. The shift control system according to one of claim 1 or 2, wherein:

the transmission controller is configured to compare the actual gear ratio and the target gear ratio, when the speed detected by the speed detecting device is equal to or more than a second predetermined speed, the transmission controller is configured to:

detect a finish of the downshift, determine that the actual gear ratio is closer to a low side relative to the target gear ratio, and end limiting the operating speed of the shift actuator.

5. A shift control system for a V-belt type continuously variable transmission of a vehicle in which a V-belt is wound between a primary pulley of an input side connected to an engine and a secondary pulley of an output side, a primary pulley pressure acting on the primary pulley and a secondary pulley pressure acting on the secondary pulley are generated respectively with a line pressure as an original pressure, and a shift actuator operable to an operating position corresponding to a target gear ratio, wherein a differential pressure is generated between the primary pulley pressure and the secondary pulley pressure to change widths of V-shaped grooves of the primary pulley and the secondary pulley so that an actual gear ratio that is obtained from speed ratio of the primary pulley and the secondary pulley becomes equal to the target gear ratio, the shift control system comprising:

- a transmission controller configured to control the shift actuator, configured to detect a downshift of the continuously variable transmission, and configured to compare the actual gear ratio and the target gear ratio,
- a speed detecting device configured to detect a speed of the vehicle; and
- an idle state detecting device configured to detect an idle state of the engine,
- wherein the transmission controller is configured to limit an operating speed of the shift actuator to prevent slippage of the V-belt when:
  - the speed detected by the speed detecting device is less than a first predetermined speed,
  - the transmission controller detects the downshift, and
  - the idle state detecting device does not detect the idle state of the engine,
- wherein the transmission controller is configured to lower an operating speed of the shift actuator when a speed detected by the speed detecting device is less than an upshift determination vehicle speed, and
- wherein when the speed detected by the speed detecting device is equal to or more than a second predetermined speed, the transmission controller is configured to:
  - detect a finish of the downshift,
  - determine that the actual gear ratio is closer to a low side relative to the target gear ratio, and
  - end limiting the operating speed of the shift actuator.

6. The shift control system according to claim 5, wherein the transmission controller is configured to:
- set an intermediate target gear ratio between the actual target gear ratio and the target gear ratio, the intermediate target gear ratio being gradually brought close to the target gear ratio,
- control the shift actuator so that the actual gear ratio reaches the intermediate target gear ratio, and
- detect the downshift when a difference is more than a predetermined value between the intermediate target gear ratio and the actual gear ratio.

* * * * *